United States Patent [19]
Lauritzen et al.

[11] Patent Number: 5,387,008
[45] Date of Patent: Feb. 7, 1995

[54] GENERANT PRELOAD AND TOLERANCE TAKEUP ASSEMBLY FOR VEHICULAR AIRBAG INSTALLATION

[75] Inventors: Donald R. Lauritzen, Hyrum; Joseph L. Ralston, North Ogden, both of Utah

[73] Assignee: Morton International, Inc., Chicago, Ill.

[21] Appl. No.: 512,258

[22] Filed: Mar. 14, 1994

[51] Int. Cl.6 .............................................. B60R 21/28
[52] U.S. Cl. ................................... 280/741; 280/732; 280/736; 102/531
[58] Field of Search .................. 280/728 R, 741, 732, 280/736, 728 A; 102/530, 531, 380

[56] References Cited

U.S. PATENT DOCUMENTS

| | | | |
|---|---|---|---|
| 3,532,359 | 10/1970 | Teagew et al. | 280/741 |
| 4,131,299 | 12/1978 | Ono et al. | 280/736 |
| 4,249,673 | 2/1981 | Katoh et al. | 222/3 |
| 4,276,005 | 6/1981 | Niko et al. | 102/531 |
| 4,370,930 | 1/1983 | Strasset et al. | 280/741 X |
| 4,846,368 | 7/1989 | Goetz | 222/3 |
| 4,950,458 | 8/1990 | Cunnigham | 280/736 X |
| 5,031,932 | 7/1991 | Frantom et al. | 280/741 |
| 5,199,741 | 4/1993 | Swann et al. | 102/531 X |
| 5,201,542 | 4/1993 | Thuen et al. | 102/530 |
| 5,219,178 | 6/1993 | Kolani et al. | 280/732 X |

OTHER PUBLICATIONS

Derwent Abstract 89-185772/26 of German Patent Publication 3741829 A1 with copy of said Pat. Pub. attached.

*Primary Examiner*—Richard M. Camby
*Assistant Examiner*—Christopher P. Ellis
*Attorney, Agent, or Firm*—George W. Rauchfuss, Jr.; Gerald K. White

[57] ABSTRACT

An all-metal preload for the gas generant charge of a passenger-side vehicular airbag assembly includes a base member which lodges firmly in one end of the cylindrical filter. A contact member engages the end of the generant charge. Spring means are interposed between the base member and the contact member for maintaining a compressive force against the generant charge.

19 Claims, 4 Drawing Sheets

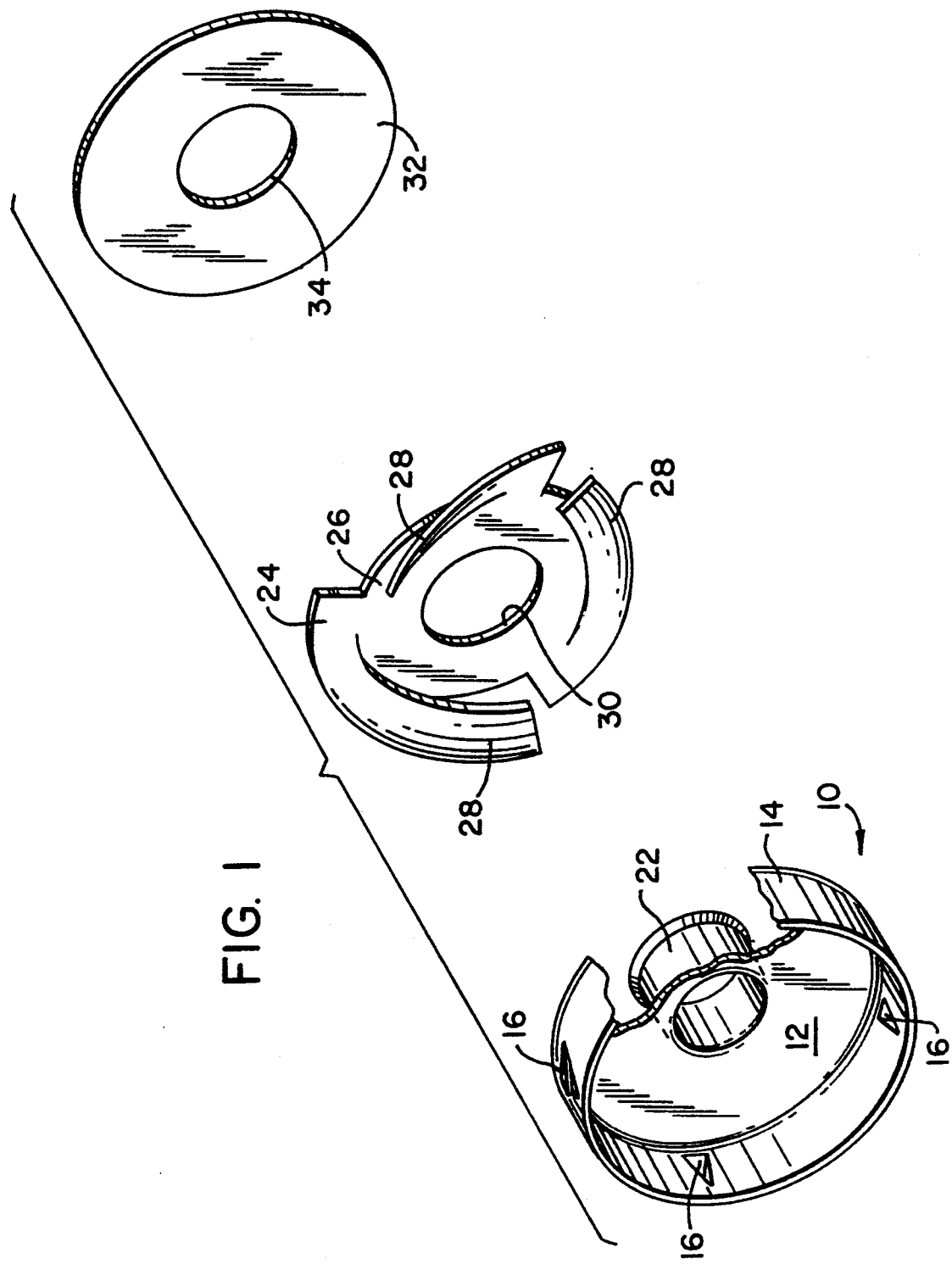

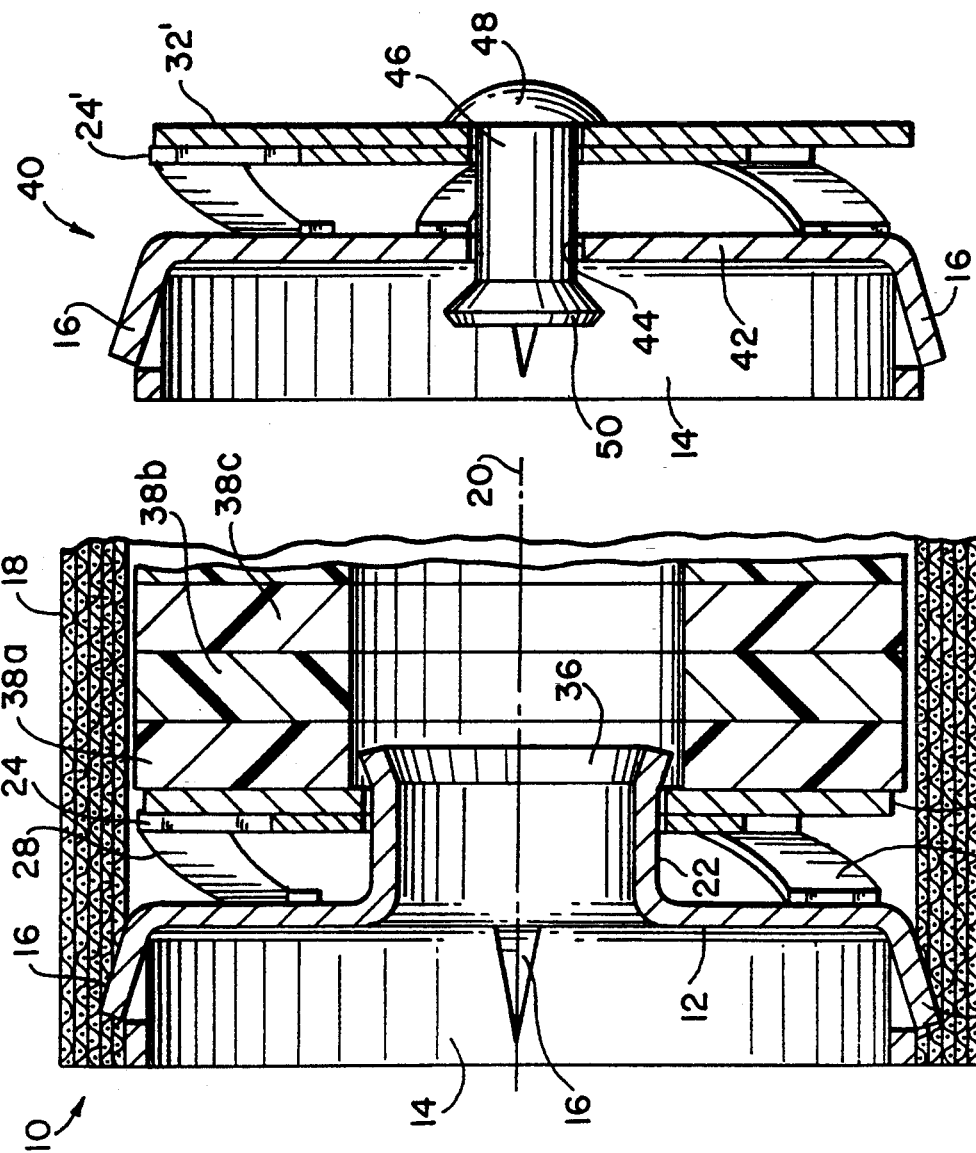

FIG. 4
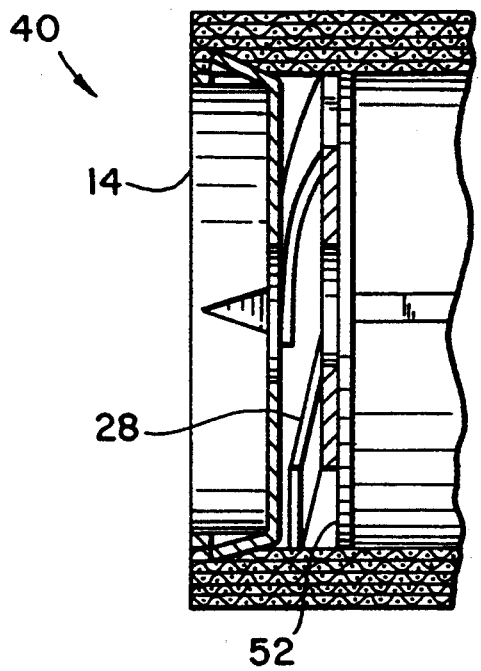
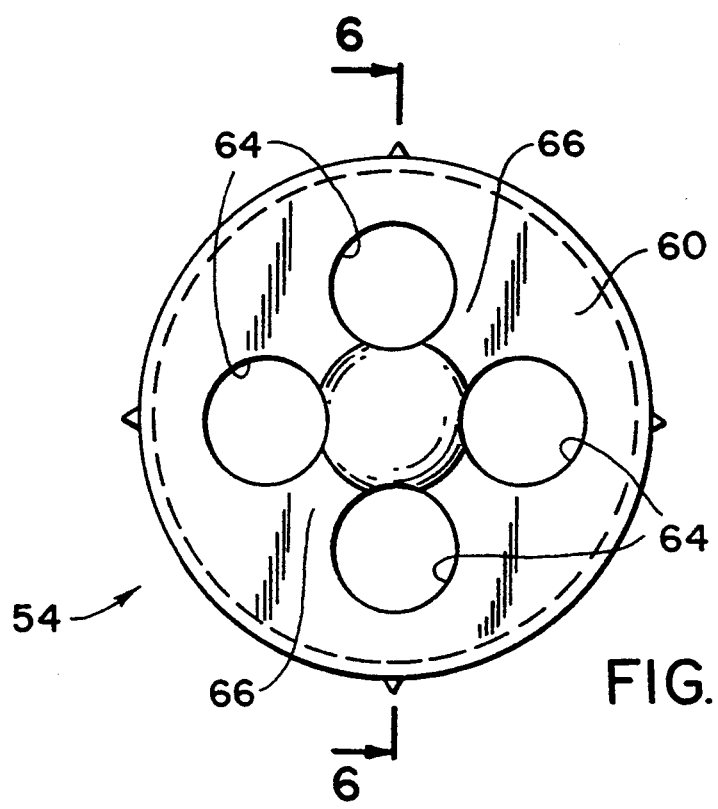
FIG. 5

GENERANT PRELOAD AND TOLERANCE TAKEUP ASSEMBLY FOR VEHICULAR AIRBAG INSTALLATION

TECHNICAL FIELD

This invention relates to the field of automotive airbag installations. More specifically, it relates to apparatus for preloading the generant and taking up tolerance differences.

BACKGROUND ART

The generant which is employed in automotive airbag installations may be any of several types. The charge may be made up of loose pellets, of stacked wafers, or may comprise one or more single extruded grains. In a passenger-side airbag installation, the generant charge is normally installed in a cylindrical ignition can and is surrounded by a cylindrical filter which may be made, for example, from materials such as steel wool to prevent sparks or particles of hot material from entering the airbag. It is necessary to preload the generant charge in order to cushion it from damage due to shock and to prevent looseness that would permit movement under vibration. An additional reason for preloading is the difference in thermal expansion between the aluminum and steel portions of the installation. The ignition chamber is normally aluminum while its internal components are primarily steel. As a result, the aluminum, which has greater heat expansion, is the first to be affected. Although temperature changes during normal operation are usually slow and have little effect on the length differential, the assembly must undergo testing requirements wherein the temperature change conditions are more exaggerated.

Most commonly, preload is accomplished by the use of foamed rubberized silicone pads such as disclosed, for example, in U.S. Pat. No. 4,846,368 of Goetz. The problem with using this material is that it is subject to off-gassing and burning.

Another problem with prior art preload assemblies is that the preload mechanism is not normally a part of the filter/generant assembly, thereby resulting in a more complex installation than would be desired.

Accordingly it is a primary object of the present invention to provide a generant preload which is metallic to preclude off-gassing and burning. Another object is to provide such a preload which is integral with the filter to simplify assembly. Other objects, features and advantages will become apparent from the following description and appended claims.

DISCLOSURE OF INVENTION

The invention comprises a preload for a vehicular airbag system which includes a hollow cylindrical filter retaining therein a substantially cylindrical gas generant. The preload is seated against one end of the gas generant and includes a metallic cup-shaped body seated securely within one end of the filter. A metallic contact member engages the corresponding end of the gas generant. Metallic spring means are provided between the contact member and the body for maintaining an axial compressive force against the gas generant.

BRIEF DESCRIPTION OF THE DRAWINGS

FIG. 1 is an exploded isometric view of a three piece preload in accordance with the present invention;

FIG. 2 is an elevational cross-section of the preload of FIG. 1 shown installed at one end of a filter assembly and generant charge;

FIG. 3 is a modified version of the preload of FIG. 2;

FIG. 4 is another version of the preload of FIGS. 2 and 3

FIG. 5 is a front view of another modification of the preload of the present invention;

FIG. 6 is a cross-section taken substantially along the line 6—6 of FIG. 5;

BEST MODE FOR CARRYING OUT THE INVENTION

Figure 7:
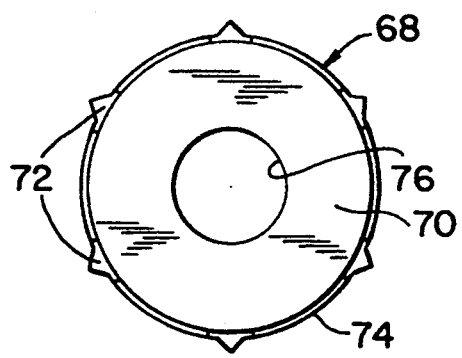
FIG. 7 is a front view of the base portion of another modification of the preload of this invention.
Figure 8:
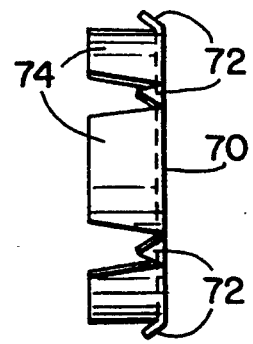
FIG. 8 is a side view of the base of FIG. 7.

FIGS. 1 and 2 illustrate a three part preload which might be used, for example, with a gas generant in the form of a plurality of stacked wafers. It comprises a cup-shaped steel body 10 comprising a substantially circular base 12 surrounded by a sidewall 14. The sidewall 14 is pierced and bent to provide a plurality of radially extending barbs 16. The barbs 16 are designed to engage the inner surface of a cylindrical filter 18 so that the body 10 is substantially coaxial with the filter 18 along its longitudinal axis 20. In the illustrated embodiment, the base 12 is not an uninterrupted disc but is formed to provide a central hub 22. Mounted over the hub 22 and slidable therealong is a steel finger spring washer 24. A finger spring washer is a commercially available element, comprising an annular disc 26 from which depend spring fingers 28. An opening 30 in the finger spring washer 24 is sufficiently large to permit movement along the axis of hub 22. The preload of FIGS. 1 and 2 is completed by an annular steel disc washer 32 which may have a central opening 34 substantially equal to the opening 30 in the finger spring washer. These elements are assembled as illustrated in FIG. 2, whereupon the end of the hub 22 is expanded to form a cone 36 to retain the elements in a single assembly.

One application of the preload of FIGS. 1 and 2 is illustrated in FIG. 2. As shown therein, the gas generant charge comprises a plurality of stacked wafers 38a–c which are urged compressively against the washer 32, compressing the spring fingers 28.

Normally the preload of this invention would be installed at only one end of the generant charge. One example of such an installation is described and illustrated in copending application Ser. No. 08/213,176 of Lauritzen, Green, and Rose (attorney's docket No. 2336-21-00), filed concurrently with this application and assigned to the same assignee. The disclosure of that application is fully incorporated by reference herein. It will also be apparent, however, that if desired, the preloads could be employed at each end of the generant charge.

FIG. 3 illustrates a modified version of the preload of FIGS. 1 and 2. Its body 40 is essentially similar in many respects including the sidewall 14 and barbs 16. However, its base 42 is in the form of an annular disc defining a central hole 44. The finger spring washer 24' and the annular disc washer 32' are basically similar but have smaller central openings. Through these openings passes a rivet-like hub member in the form of a pin 46 having an enlarged head 48 bearing against the washer 32' and an expanded head 50 at its other end serving to retain the preload members together. The FIG. 3 version of the invention is particularly useful when the gas generant comprises a mass of pellets because the end of the preload will close the end of the filter assembly and prevent the escape of any pellets.

FIG. 4 illustrates another version of the preload of this assembly. The modified preload illustrated in FIG. 4 is essentially similar to that of FIG. 3 and, accordingly, is given similar reference numerals. However, in this version the central rivet-like member including pin 46 is omitted and the washer 32 is replaced by a disc 52. In this version the preload may be three separate elements or the elements may be combined by tack welding or other suitable means.

A further modification of the invention is illustrated in FIGS. 5 and 6. This is a one-piece preload which has a body 54 similar to those previously described in that it includes a sidewall 56 with barbs 58 and a circular base 60. It differs, however, in that the member engaging the generant charge is a raised central portion 62 of the base 60. The base 60 is drilled to provide a plurality of circumferentially situated circular openings 64 surrounding the raised central portion 62. This member, similarly to the preloads previously described, is of steel. Accordingly when the raised central portion 62 is depressed by the force of the generant charge, the steel 66 remaining between the openings 64 functions as springs to achieve the objectives of the invention.

A still further modification of this invention is illustrated in FIGS. 7-12. This is a two part assembly. A cup-shaped body 68 is formed from a sheet metal stamping. It includes a planar base 70 having projecting barbs 72 and surrounded by a segmented sidewall 74. The base 70 defines a central circular opening 76.

Figure 9:
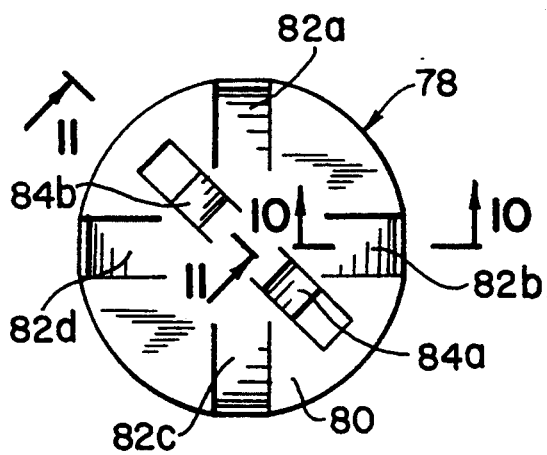
FIG. 9 is a front view of a spring member usable with the base of FIG. 7.
Figure 10:
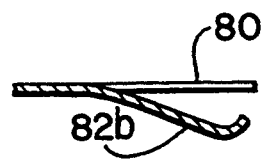
FIG. 10 is a cross-section taken substantially along the line 10—10 of FIG. 9.
Figure 11:
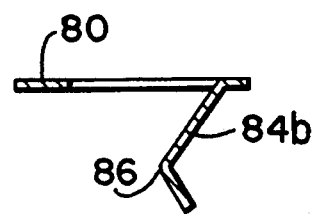
FIG. 11 is a cross-section taken substantially along the line 11—11 of FIG. 9.

The spring member 78 of this modification is illustrated in FIG. 9. It is formed of a disc 80 of a sheet material such as steel. Four pairs of parallel slots extend to the edge of the disc to form four radial leaf springs 82a-d. These springs are bent downwardly and recurved at their ends into the configuration illustrated in FIG. 10. A pair of diametrically opposed slots in the disc 80 form a pair of retaining tines 84a,b. Each of the retaining tines is bent downwardly as illustrated in FIG. 11 and then bent again to form a knee 86. The distance between the two knees is slightly greater than the diameter of the opening 76 in body 68.

Figure 12:
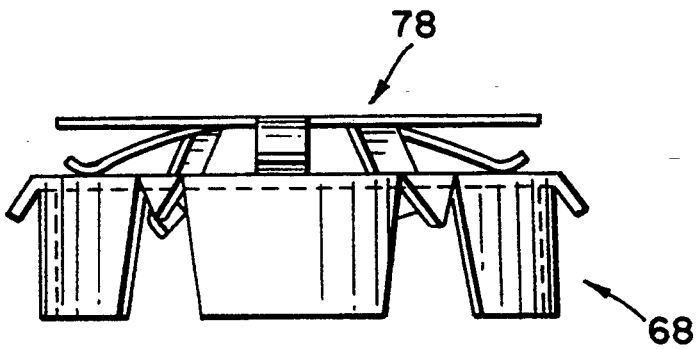
FIG. 12 is a side view of the assembled base portion of FIG. 7 and spring member of FIG. 9.

The spring member 78 is assembled to the body 68 as illustrated in FIG. 12. The spring-like retaining tines 84a,b are forced through the opening 76 and snap the spring member into engagement with the body 68, the leaf springs 82a-d then engaging the base 70 as illustrated.

The FIGS. 7-12 version of this invention is illustrated as including four leaf springs and two retaining tines. However, it will be appreciated that this is for illustration only. Any number of either element may be incorporated into the assembly. One important feature of the FIGS. 7-12 modification is that the base 68 may be used without the spring member on one end of the filter assembly if desired.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In a gas generating assembly for a vehicular airbag system including a substantially hollow, cylindrical filter having a longitudinal central axis and first and second ends, a substantially cylindrical gas generant having first and second ends and retained within said filter substantially coaxial therewith, and a preload seated against the first end of said gas generant to apply a compressive force thereagainst, the improvement wherein said preload comprises:
   a metallic cup-shaped body having a sidewall seated securely within the first end of said filter and substantially coaxial therewith and a substantially circular base bounded by said sidewall;
   a metallic contact member engaging the first end of said gas generant; and
   metallic spring means intermediate said base and contact member for maintaining an axial compressive force against the first end of said gas generant.

2. The improvement of claim 1 wherein said contact member comprises a disc.

3. The improvement of claim 2 wherein said spring means comprises a finger spring washer.

4. The improvement of claim 2 wherein said preload additionally comprises means for maintaining said body, contact member, and spring means as a unitary assembly.

5. The improvement of claim 4 wherein said contact member comprises an annular disc defining an axial opening therethrough and said maintaining means comprises an axially slidable hub interconnecting said axial opening and the base of said cup-shaped body.

6. The improvement of claim 5 wherein said hub is a substantially cylindrical axial extension of the base of said cup member and is captured within the axial opening of the annular disc.

7. The improvement of claim 5 wherein the base of said cup-shaped body defines an axial opening therethrough and said hub comprises:
   a pin having a first end extending through the axial opening in the base of the cup-shaped body and a second end extending through the axial opening of the annular disc;
   an enlarged head on the first end of said pin to capture it within said base; and
   an enlarged head on the second end of said pin to capture it within said annular disc.

8. The improvement of claim 1 wherein said contact member comprises a raised central portion of the base of said cup-shaped body and said spring means comprises portions of said base.

9. The improvement of claim 8 wherein said base defines openings spaced circumferentially thereabout relative to said longitudinal central axis and said spring means comprise the base portions intermediate said radially spaced openings.

10. The improvement of claim 1 wherein said contact member and said spring means are unitary.

11. The improvement of claim 10 wherein said unitary contact member and spring means additionally comprise at least one retaining tine engageable with said cup-shaped body.

12. A preload for the gas generant of an automotive airbag installation, which generant has first and second ends and is housed within a cylindrical filter having first and second ends, which comprises:
- a metallic cup-shaped body having a sidewall seatable securely within the first end of said filter, substantially coaxial therewith, and a substantially circular base bounded by said sidewall;
- a metallic contact member engageable with the first end of said generant; and
- metallic spring means intermediate said base and contact member for maintaining an axial compressive force against the first end of said gas generant.

13. The preload of claim 12 wherein said cup-shaped body, contact member, and spring means are interconnected.

14. The preload of claim 13 wherein said body member includes an axial hub and said contact member and spring means are annular and slidably supported on said hub.

15. The preload of claim 13 wherein each of said body, contact member, and spring means is annular and they are interconnected by a rivet-like member extending through their central openings.

16. The preload of claim 13 wherein said contact member comprises a raised central portion of the base of said cup-shaped body and said spring means comprises portions of said base.

17. The preload of claim 16 wherein said base defines openings spaced radially thereabout relative to said longitudinal central axis and said spring means comprises the base portions intermediate said radially spaced openings.

18. The preload of claim 12 wherein said contact member and said spring means are unitary.

19. The preload of claim 18 wherein said spring means are leaf springs formed in said contact member and wherein said contact member additionally includes retaining tines engageable with said cup-shaped body.

* * * * *

UNITED STATES PATENT AND TRADEMARK OFFICE
CERTIFICATE OF CORRECTION

PATENT NO. : 5,387,008
DATED : February 7, 1995
INVENTOR(S) : Donald R. Lauritzen and Joseph L. Ralston It is certified that error appears in the above-indentified patent and that said Letters Patent is hereby corrected as shown below:

On the title page, item [21], "512,258" should read --212,258.

Signed and Sealed this

Thirteenth Day of June, 1995

Attest:

BRUCE LEHMAN

Attesting Officer

Commissioner of Patents and Trademarks